US007978119B2

(12) United States Patent
Heigl

(10) Patent No.: US 7,978,119 B2
(45) Date of Patent: Jul. 12, 2011

(54) WIRELESS VEHICLE ACCESS CONTROL SYSTEM

(76) Inventor: Keith D. Heigl, Winamac, IN (US)

(*) Notice: Subject to any disclaimer, the term of this patent is extended or adjusted under 35 U.S.C. 154(b) by 0 days.

(21) Appl. No.: 12/517,448

(22) PCT Filed: Dec. 6, 2007
(Under 37 CFR 1.47)

(86) PCT No.: PCT/US2007/086646

§ 371 (c)(1),
(2), (4) Date: Jun. 25, 2010

(87) PCT Pub. No.: WO2008/070779

PCT Pub. Date: Jun. 12, 2008

(65) Prior Publication Data

US 2010/0283581 A1 Nov. 11, 2010

Related U.S. Application Data

(60) Provisional application No. 60/868,831, filed on Dec. 6, 2006.

(51) Int. Cl.
*H04L 17/02* (2006.01)

(52) U.S. Cl. .......................... 341/176; 318/445; 381/86

(58) Field of Classification Search .................. 341/176; 318/445; 381/86
See application file for complete search history.

(56) References Cited

U.S. PATENT DOCUMENTS

| | | | |
|---|---|---|---|
| 3,651,965 | A | 3/1972 | Simonelli et al. |
| 3,874,527 | A | 4/1975 | Royce |
| 4,164,292 | A | 8/1979 | Karkau |
| 4,176,999 | A | 12/1979 | Thorley |
| 4,251,179 | A | 2/1981 | Thorley |
| 4,325,668 | A | 4/1982 | Julian et al. |
| 4,339,224 | A | 7/1982 | Lamb |
| 4,576,539 | A | 3/1986 | Williams |
| 5,140,316 | A | 8/1992 | DeLand et al. |
| 5,180,275 | A | 1/1993 | Czech et al. |
| 5,261,779 | A | 11/1993 | Goodrich |
| 5,293,632 | A | 3/1994 | Novakovich et al. |
| 5,299,904 | A | 4/1994 | Simon et al. |
| 5,305,355 | A | 4/1994 | Go et al. |
| 5,308,214 | A | 5/1994 | Crain et al. |
| 5,350,986 | A | 9/1994 | Long et al. |
| 5,380,144 | A | 1/1995 | Smith et al. |

(Continued)

OTHER PUBLICATIONS

"The 1999 Ford Windstar", VMI Voice Technical Edition, Publication, Apr. 1999.

(Continued)

*Primary Examiner* — Albert K Wong
(74) *Attorney, Agent, or Firm* — Michael Best & Friedrich LLP

(57) ABSTRACT

A system and method for coordinating movement of a powered sliding door module and an access ramp for a vehicle is shown in FIG. 5 An OEM key fob (26*a*) is modified to send a non-OEM signal when a passenger side sliding door button is pressed A non-OE controller (70) receives the non-OEM signal and, depending on whether the passenger side sliding door is opened or closed, and whether the access ramp is stowed or deployed, sends the OEM signal to open the door before deploying the ramp, or delays sending the OE signal until the ramp is stowed In another embodiment, an OEM receiver is modified to receive a non-OEM signal and the control configured to receive the OEM signal and send or delay sending of the non-OEM signal depending on the condition of the door and ramp.

15 Claims, 11 Drawing Sheets

U.S. PATENT DOCUMENTS

| | | | |
|---|---|---|---|
| 5,389,920 | A | 2/1995 | DeLand et al. |
| 5,391,041 | A | 2/1995 | Stanbury et al. |
| 5,396,158 | A | 3/1995 | Long et al. |
| 5,434,487 | A | 7/1995 | Long et al. |
| 5,697,048 | A | 12/1997 | Kimura |
| 5,737,335 | A | 4/1998 | Mizuta et al. |
| 5,769,480 | A | 6/1998 | Gebhardt |
| 5,825,098 | A | 10/1998 | Darby et al. |
| 5,835,873 | A | 11/1998 | Darby et al. |
| 5,979,114 | A | 11/1999 | Clark et al. |
| 6,028,537 | A | 2/2000 | Suman et al. |
| 6,042,327 | A | 3/2000 | Deleo et al. |
| 6,053,693 | A | 4/2000 | Ringdahl et al. |
| 6,064,165 | A | 5/2000 | Boisvert et al. |
| 6,075,460 | A | 6/2000 | Minassale et al. |
| 6,077,025 | A | 6/2000 | Budd et al. |
| 6,179,545 | B1 | 1/2001 | Petersen, Jr. et al. |
| 6,238,168 | B1 | 5/2001 | Cohn et al. |
| 6,238,169 | B1 | 5/2001 | Dupuy et al. |
| 6,275,167 | B1 | 8/2001 | Dombrowski et al. |
| 6,300,879 | B1 | 10/2001 | Regan et al. |
| 6,302,439 | B1 | 10/2001 | McCurdy |
| 6,357,992 | B1 | 3/2002 | Ringdahl et al. |
| 6,409,458 | B1 | 6/2002 | Cohn et al. |
| 6,515,377 | B1 | 2/2003 | Ubelein et al. |
| 6,594,565 | B1 | 7/2003 | Schafer et al. |
| 6,825,628 | B2 | 11/2004 | Heigl et al. |
| 7,186,205 | B2 | 3/2007 | Lahr et al. |
| 7,274,980 | B1 | 9/2007 | Schafer et al. |
| 7,417,395 | B2 | 8/2008 | Edwards et al. |
| 7,453,224 | B2 | 11/2008 | Sullivan |
| 7,551,995 | B2 | 6/2009 | Heigl et al. |
| 7,684,915 | B1 | 3/2010 | Dailey et al. |
| 7,798,761 | B2 | 9/2010 | Goodrich et al. |
| 7,816,878 | B2 | 10/2010 | Heigl et al. |
| 2003/0007649 | A1 | 1/2003 | Riggs |
| 2003/0007853 | A1 | 1/2003 | Cohn et al. |
| 2003/0044266 | A1 | 3/2003 | Vandillen et al. |
| 2005/0177288 | A1 | 8/2005 | Sullivan et al. |
| 2006/0104775 | A1 | 5/2006 | Kasten et al. |
| 2007/0086879 | A1 | 4/2007 | Goodrich et al. |
| 2009/0240402 | A1 | 9/2009 | Lugash et al. |

OTHER PUBLICATIONS

"Activan, Accessibility with Style. Conversion of General Motors Minivans", Service Manual, Dec. 9, 1999, Published by Ricon Corporation.

"Braun Entervan", Brochure, 2001, Published by the Braun Corporation.

"Entervan, The Braun Corporation", Series 03 and later Fully-Automatic 1996 and newer Chrysler Entervan II, Owner's/Service Manual, Revision Aug. 1998, 5230096-03.

Holicky, Richard, "Big Vans, Minivans Pros and Cons", New Mobility Magazine, Jun. 1997.

"Honda Odyssey Minivan Conversion", Owner's Manual, Oct. 2006, Published by VMI.

"New Ramp & Electrical Systems on All Power Rampvans", Available online at: <www.ims-vans.com/RampElectrical.htm>, May 12, 1999.

"Odyssey 2005-2006 Electrical Troubleshooting", Manual, Mar. 2006, Published by American Honda Motor Co., Inc.

"Automotive: Serial Communication", Installation Guide Model MPC01 Multi-Purpose Controller, 1998, Published by Whelan Engineering Company Inc., Chester, CT.

"Automotive: Serial Communication", Installation Guide Model MPC01 Multi-Purpose Controller, 1995, Published by Whelan Engineering Company Inc., Chester, CT.

Sunderlin, Ann, "Van-Tastic, How'd They Do That", Nov. 1995, Paraplegia News Magazine.

"Wheels 2000 and Beyond", New Mobility Magazine, p. 48, publicly available prior to Jan. 1, 2002.

"VMI-4 Ford Windstar Factory Door Lockout Relay Pack", "Operation Characteristics of the VMI-4 Module", Technical Service Manual, Mar. 9, 2000.

International Search Report and Written Opinion of International Searching Authority, PCT/US2007/086646, mailed Sep. 15, 2008.

"IMS Quality Team 1991-2001 Service Manual" Independent Mobility Systems, Inc. (Jan. 8, 1999).

"Honda Odyssey Minivan Conversion Owner's Manual" Vantage Mobility International (Oct. 2006).

"Ricon Activan Illustrated Index of Non-OEM Vehicle Equipment Including Electrical and Pneumatic Circuit Diagrams plus Diagnostic Flow Charts" Ricon Corporation, pp. 1-1 to 3-5 (May 10, 1999-Jun. 3, 1999).

"Ricon Activan General Motors Minivan Conversion Service Manual—32DV0002.C" Ricon Corporation, pp. 1-1 to 6-13 (Jan. 3, 2000).

"Ricon Activan Service/Owner Manual—35DACT00.E" Ricon Corporation (Dec. 3, 1998).

Declaration of Steven Stadler (Jul. 28, 2006).

"Ricon Activan Conversion of General Motors Minivans Service Manual—32DV0002.A" Ricon Corporation (Dec. 9, 1999).

"Ricon Activan Conversion of General Motors Minivans Service Manual—32DV0002.B" Ricon Corporation (Dec. 9, 1999).

"Vantage Mini Vans Technical Service Manual" Vantage Mobility International (Jul. 10, 1997).

Vantage Mobility International Online Service Materials, Minivan Products Summit Northstar Kia HAV.

Vantage Mobility International Service Manual Excerpts for Systems Designed for 1993-2001 Model-Year Vehicles.

"IMS-Vans.com Whois Record" accessed from Domain Tools (Sep. 19, 2009).

"Vantage Mini Vans Owners Manual" Vantage Mobility International.

"VMI Minivan Conversions Owner's Manual" Vantage Mobility International.

Various Power Sliding Door Electrical Diagrams for 1997-1999 Model-Year Vehicles, accessed from Alldata Online (Aug. 20, 2009).

Waybackmachine www.ims-vans.com Website Excerpts from 1998-1999.

Waybackmachine www.braunlift.com Website Excerpts from 2000.

Correspondence, Pricing Lists and Invoices Relating to Ricon Activan (1999).

"EV Braun Entervan Brochure" The Braun Corporation (1999).

"Entervan Application Guide" The Braun Corporation (Jan. 1999).

"IMS Service Manual 1996-1998 Chrysler NS 1996-1998 Ford Windstar" Independent Mobility Systems, Inc. (Nov. 24, 1997).

"IMS 2004 Sienna Rampvan Service Manual" Independent Mobility Systems, Inc.

"IMS Service Manual 1994-1995 Chrysler" Independent Mobility Systems, Inc. (May 3, 1996).

"Plaintiff The Braun Corporation's Claim Terms at Issue and Proposed Definitions" *The Braun Corporation* v. *Vantage Mobility International, LLC et al.*, Civil Action No. 06-cv-050 RL, United States District Court for the Northern District of Indiana Hammond Division (Jun. 14, 2007).

"Plaintiff's Responses to Defendant American Honda Motor Co., Inc.'s First Set of Interrogatories (Nos. 1-12)" *The Braun Corporation* v. *Vantage Mobility International, LLC et al.*, Civil Action No. 06-cv-050 RL, United States District Court for the Northern District of Indiana Hammond Division (Dec. 18, 2006).

Draft Invalidity Claim Chart for IMS System: '628 Patent by David M. Auslander (Mar. 26, 2009).

"Braun's Responses to VMI's Requests for Admissions" *The Braun Corporation* v. *Vantage Mobility International, LLC*, Civil Action No. 2:06-cv-050-JVB-PRC, United States District Court for the Northern District of Indiana Hammond Division (Apr. 5, 2010).

Draft Invalidity Claim Chart for Ricon System: '628 Patent by David M. Auslander (Mar. 26, 2009).

Braun OEM Door Patent Review by Paul Edwards and Summary of Paul Edwards Interview Jun. 3, 2006.

"SAE J1850 Class B Data Communications Network Interface J1850 Topics" Bill Wiegand, GM Service Technology Group (Feb. 16, 1998).

"List of Terms to be Defined in the '628 Patent" *The Braun Corporation* v. *Vantage Mobility International, LLC*, Civil Action No. 2:06-cv-050-RL-PRC, United States District Court for the Northern District of Indiana Hammond Division (Jun. 14, 2007).
"VMI's Supplemental Answer to Interrogatory No. 9" *The Braun Corporation* v. *Vantage Mobility International, LLC et al.*, Civil Action No. 06-cv-050 RL, United States District Court for the Northern District of Indiana Hammond Division (May 27, 2009).
"Parties' Responses to Proposed Order & Opinion- Transcript of Proceedings" *The Braun Corporation* v. *Vantage Mobility International, LLC*, Civil Action No. 2:06-cv-050-JVB, United States District Court for the Northern District of Indiana Hammond Division (Jul. 28, 2008).
"Vantage Mobility International, LLC's Answers to Interrogatories" *The Braun Corporation* v. *Vantage Mobility International, LLC et al.*, Civil Action No. 06-cv-050 RL, United States District Court for the Northern District of Indiana Hammond Division (Mar. 12, 2007).
"Initial Disclosure Statement" *The Braun Corporation* v. *Vantage Mobility International, LLC*, Civil Action No. 2:06-cv-050-RL, United States District Court for the Northern District of Indiana Hammond Division (Sep. 12, 2006).
"Vantage Mobility International, LLC's Answers to Braun's Third Set of Interrogatories" *The Braun Corporation* v. *Vantage Mobility International, LLC et al.*, Civil Action No. 06-cv-050 RL, United States District Court for the Northern District of Indiana Hammond Division (May 14, 2007).
Ricon Updated Remote Control Specification (Mar. 20, 1998).
Vantage Mobility International, LLC's Answers to Braun's First Set of Interrogatories, *The Braun Corporation* v. *Vantage Mobility International, LLC et al.*, Civil Action No. 06-cv-050 RL, United States District Court for the Northern District of Indiana Hammond Division (Dec. 18, 2006).
"Supplemental Answers to Interrogatories" *The Braun Corporation* v. *Vantage Mobility International, LLC et al.*, Civil Action No. 06-cv-050 RL, United States District Court for the Northern District of Indiana Hammond Division (May 15, 2009).
"Amended Complaint for Patent Infringement" *The Braun Corporation* v. *Vantage Mobility International, LLC et al.*, Civil Action No. 06-cv-050 RL, United States District Court for the Northern District of Indiana Hammond Division (Jun. 15, 2006).
"Vantage Mobility International's Third Supplemental Responses to Requests for Production" *The Braun Corporation* v. *Vantage Mobility International, LLC et al.*, Civil Action No. 06-cv-050 RL, United States District Court for the Northern District of Indiana Hammond Division (Mar. 12, 2007).
"Defendant Vantage Mobility International, LLC's Answer to Plaintiff's Complaint and Counterclaim" *The Braun Corporation* v. *Vantage Mobility International, LLC*, Civil Action No. 2:06-cv-050-RL-PRC, United States District Court for the Northern District of Indiana Hammond Division (Aug. 9, 2006).
"Amended Answer of Defendant American Honda Motor Co., Inc." *The Braun Corporation* v. *Vantage Mobility International, LLC et al.*, Civil Action No. 06-cv-050 RL, United States District Court for the Northern District of Indiana Hammond Division (Aug. 22, 2006).
"Plaintiff's Reply to Defendant American Honda Motor Co.'s Counterclaim" *The Braun Corporation* v. *Vantage Mobility International, LLC et al.*, Civil Action No. 06-cv-050 RL, United States District Court for the Northern District of Indiana Hammond Division (Aug. 29, 2006).
"Plaintiff's Reply to Defendant Vantage Mobility International, LLC's Counterclaim" *The Braun Corporation* v. *Vantage Mobility International, LLC et al.*, Civil Action No. 06-cv-050 RL, United States District Court for the Northern District of Indiana Hammond Division (Aug. 29, 2006).
"Defendant Vantage Mobility International, LLC's Amended Answer to Plaintiff's Complaint and Counterclaim" *The Braun Corporation* v. *Vantage Mobility International, LLC*, Civil Action No. 2:06-cv-050-RL-PRC, United States District Court for the Northern District of Indiana Hammond Division (Apr. 19, 2007).
"Response to Motion to Dismiss or Strike Defendant Vantage Mobility International, LLC's Defense of Inequitable Conduct" *The Braun Corporation* v. *Vantage Mobility International, LLC*, Civil Action No. 2:06-cv-050-RL-PRC, United States District Court for the Northern District of Indiana Hammond Division (Jun. 11, 2007).
"Claim Construction Brief" *The Braun Corporation* v. *Vantage Mobility International, LLC*, Civil Action No. 2:06-cv-050-RL-PRC, United States District Court for the Northern District of Indiana Hammond Division (Jun. 28, 2007).
"Plaintiffs Response to Defendant's Claim Construction Brief" *The Braun Corporation* v. *Vantage Mobility International, LLC*, Civil Action No. 2:06-cv-050-RL-PRC, United States District Court for the Northern District of Indiana Hammond Division (Jul. 26, 2007).
"Declaration of Mathew G. Gavronski in Support of Plaintiff's Response to Defendant's Claim Construction Brief" *The Braun Corporation* v. *Vantage Mobility International, LLC*, Civil Action No. 2:06-cv-050-RL, United States District Court for the Northern District of Indiana Hammond Division (Jul. 26, 2007).
"Reply to Plaintiff's Claim Construction Brief and Request for Hearing" *The Braun Corporation* v. *Vantage Mobility International, LLC*, Civil Action No. 2:06-cv-050-RL-PRC, United States District Court for the Northern District of Indiana Hammond Division (Jul. 26, 2007).
"Plaintiff s Sur-Reply Brief on Claim Construction and Memorandum in Support of Motion to Strike the Declaration of David M. Auslander" *The Braun Corporation* v. *Vantage Mobility International, LLC*, Civil Action No. 2:06-cv-050-JVB-PRC, United States District Court for the Northern District of Indiana Hammond Division (Oct. 5, 2007).
"Sur-Reply to Plaintiff's Reply and Sur-Reply Brief on Claim Construction" *The Braun Corporation* v. *Vantage Mobility International, LLC*, Civil Action No. 2:06-cv-050-RL-PRC, United States District Court for the Northern District of Indiana Hammond Division (Oct. 29, 2007).
"Proposed Opinion and Order" *The Braun Corporation* v. *Vantage Mobility International, LLC*, Civil Action No. 2:06-cv-050 JVB, United States District Court for the Northern District of Indiana Hammond Division (Jul. 17, 2008).
"Defendant's Supplemental Claim Construction Brief" *The Braun Corporation* v. *Vantage Mobility International, LLC*, Civil Action No. 2:06-cv-050-JVB-PRC, United States District Court for the Northern District of Indiana Hammond Division (Sep. 22, 2008).
"Plaintiff's Reply to Defendant's Supplemental Claim Construction Brief" *The Braun Corporation* v. *Vantage Mobility International, LLC*, Civil Action No. 2:06-cv-050-JVB-PRC, United States District Court for the Northern District of Indiana Hammond Division (Oct. 23, 2008).
"Reply Brief in Support of Defendant's Supplemental Claim Construction Brief" *The Braun Corporation* v. *Vantage Mobility International, LLC*, Civil Action No. 2:06-cv-050-JVB, United States District Court for the Northern District of Indiana Hammond Division (Nov. 7, 2008).
"Opinion and Order" *The Braun Corporation* v. *Vantage Mobility International, LLC*, Civil Action No. 2:06-cv-050-JVB, United States District Court for the Northern District of Indiana Hammond Division (Mar. 26, 2009).
"Opinion and Order" *The Braun Corporation* v. *Vantage Mobility International, LLC*, Civil Action No. 2:06-cv-050-JVB-PRC, United States District Court for the Northern District of Indiana Hammon Division (Jan. 27, 2010).
"Defendant Vantage Mobility International, LLC's Second Amended Answer to Plaintiff's Complaint and Counterclaim" *The Braun Corporation* v. *Vantage Mobility International, LLC*, Civil Action No. 2:06-cv-050-JVB-PRC, United States District Court for the Northern District of Indiana Hammond Division (Feb. 1, 2010).
"Braun's Reply to VMI's Second Amended Counterclaim" *The Braun Corporation* v. *Vantage Mobility International, LLC*, Civil Action No. 2:06-cv-050-JVB-PRC, United States District Court for the Northern District of Indiana Hammond Division (Feb. 17, 2010).
"Defendant American Honda Motor Co., Inc's Responses to Plaintiff The Braun Corporation's First Set of Interrogatories" *The Braun Corporation* v. *Vantage Mobility International, LLC et al.*, Civil Action. No. 06-cv-050 RL, United States District Court for the Northern District of Indiana Hammond Division (Dec. 18, 2006).
"Plaintiff s Claim Construction Memorandum" *The Braun Corporation* v. *Vantage Mobility International, LLC*, Civil Action No. 2:06-cv-050 RL, United States District Court for the Northern District of Indiana Hammond Division (Jun. 28, 2007).

"VMI's Response to Interrogatories" *The Braun Corporation* v. *Vantage Mobility International, LLC*, Civil Action No. 2:06-cv-050-JVB-PRC United States District Court for the Northern District of Indiana Hammond Division (Apr. 12, 2010).
"VMI's Response to Braun's Second Set of Requests for Production" *The Braun Corporation* v. *Vantage Mobility International, LLC*, Civil Action No. 2:06-cv-050-JVB-PRC United States District Court for the Northen District of Indiana Hammond Division (Apr. 12, 2010).
Declaration of Sean Whitmarsh (Apr. 9, 2010).
"Plaintiff s Responses to Vantage Mobility International, LLC's First Set of Interrogatories" *The Braun Corporation* v. *Vantage Mobility International, LLC*, Civil Action No. 2:06-cv-050-RL-PRC United States District Court for the Northern District of Indiana Hammond Division (Mar. 8, 2007).

WIRELESS VEHICLE ACCESS CONTROL SYSTEM

CROSS-REFERENCE TO RELATED APPLICATION

This application claims the benefit of U.S. Provisional Patent Application No. 60/868,831, filed Dec. 6, 2006.

BACKGROUND

The present invention relates to vehicle access systems.

Access systems, such as motorized lifts, have been used to transport people and cargo. These access systems include platforms, ramps, moving seats, movable steps, and the like, which may be attached to stationary structures, such as buildings and loading docks, or mobile structures such as vehicles. Access systems have been used to provide disabled individuals access to structures that traditionally were accessible only via steps or stairs, or required an individual to step over or across an obstacle. For example, motorized lifts and ramps have been used to allow disabled individuals to enter and exit vehicles.

Currently, many automotive manufacturers offer minivans that include a power sliding door system to automatically open or close one or both of the vehicle's sliding doors. Components such as these which are installed by the manufacturer of the vehicle are commonly referred to as OEM (Original Equipment Manufacturer) components. While the specific configurations of OEM power sliding door systems vary depending on the manufacturer, many of the systems include at least one body control module, a door control module, a receiver, a door switch and data bus. In some systems, the body control module, door control module, receiver and door switch are all in communication with the vehicle's data bus, which enables the body control module, door control module, receiver and door switch to communicate with each other and to receive a signal from a user indicating that the user wants to open or close the door (a "door operation signal"). In other systems one or more of the components may be directly wired to one another for communication using discrete signals. Generally, the user may communicate a door operation signal to the power sliding door system by pulling on a door handle of the vehicle, operating buttons positioned within the vehicle, or by pushing a button on a keyless entry device or key fob. If the door operation signal is produced by a remote device, such as the key fob, the receiver detects a signal sent from the key fob and communicates detection of that signal to the door control module which in turn operates the power sliding door system to open or close the door. If the door operation signal is produced by movement of the door handle, the door operation signal closes the door switch, which is sometimes in direct, hard wired communication with the door control system or the body control module. Closing the door switch sends a door operation signal to the power sliding door system to open or close the door.

Before manufacturers provided OEM power sliding door systems, vehicle access system providers generally installed their own door control systems, including a door motor, door sensors, and the like. Such providers would also install a powered ramp or lift device including a ramp motor and a ramp control system. Now that manufacturers are providing OEM powered door control systems, the aftermarket access system providers must coordinate operation of their ramp control systems with the operation of the OEM door control systems. Some examples of how aftermarket ramp systems and OEM door systems are coordinated are disclosed in U.S. Pat. No. 6,825,628, the contents of which are hereby incorporated by reference.

SUMMARY

One embodiment of the invention provides a method of modifying an OEM keyless entry system of a vehicle to coordinate operation of at least one OEM component with operation of at least one non-OEM component. The method includes selecting a vehicle having a keyless entry system including a remote control and a receiver in which the remote control wirelessly communicates with the receiver through a plurality of OEM signals to remotely operate OEM components. The method also includes modifying at least one of the remote control and the receiver to send or receive, respectively, a non-OEM signal instead of a selected one of the OEM signals. The method also includes installing a non-OEM component in the vehicle, and coupling a non-OEM control module to the non-OEM component. The non-OEM control module sends and/or receives the non-OEM signal.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
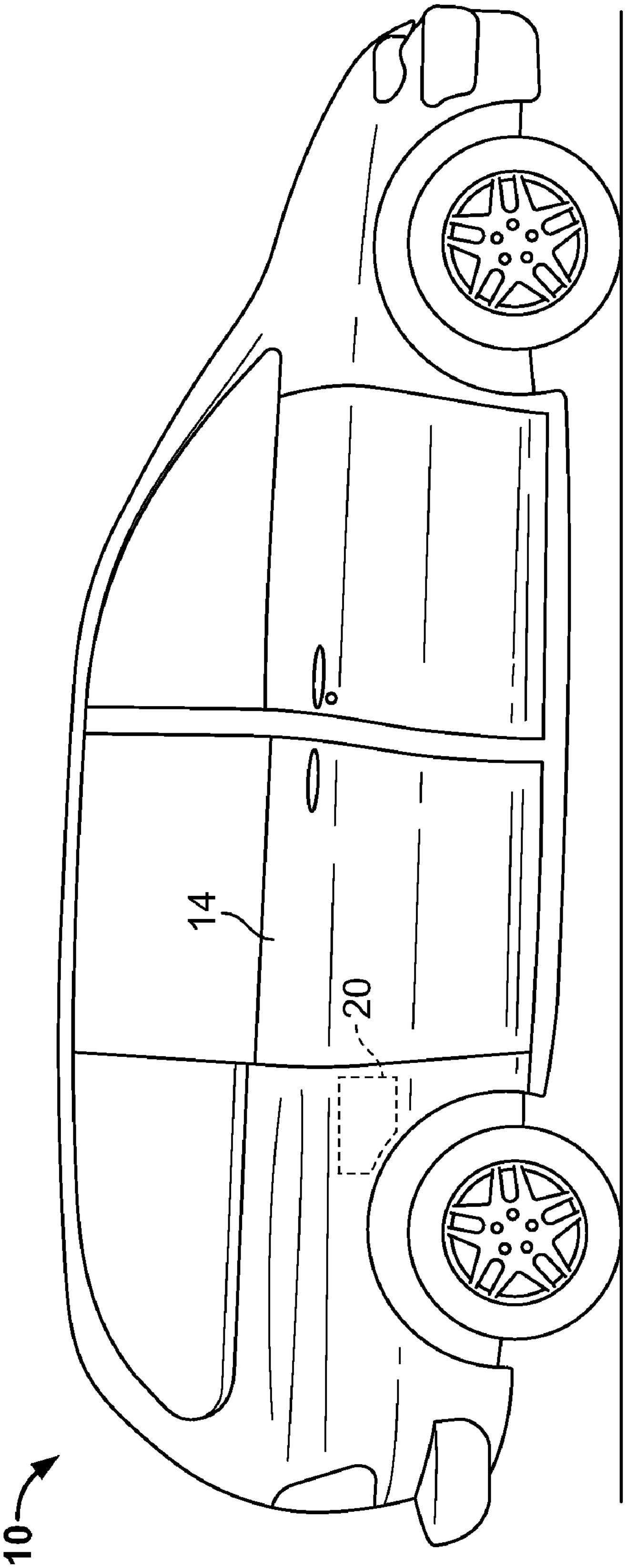
FIG. 1 is a side view of a minivan including a power sliding door.
Figure 2:
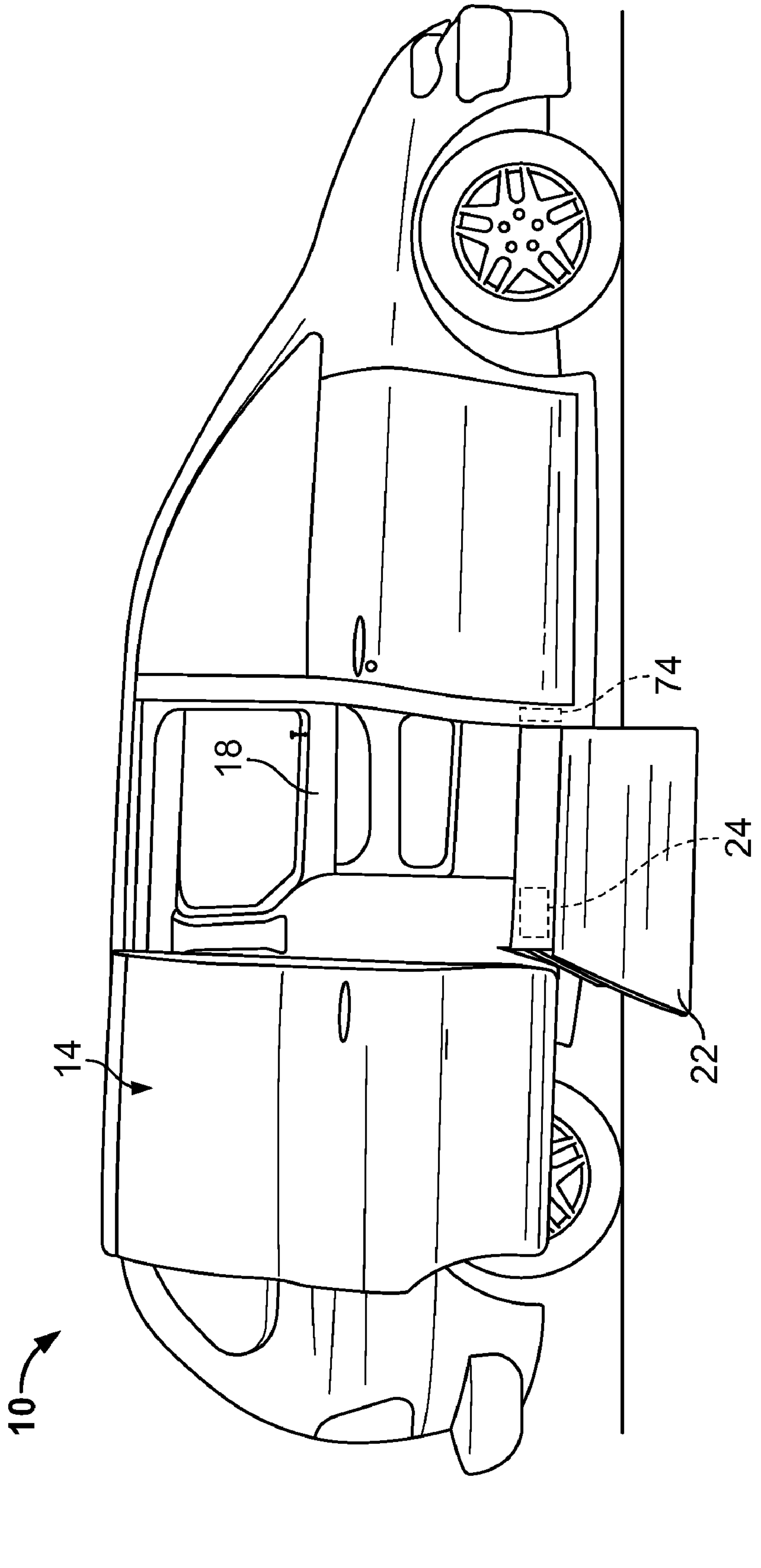
FIG. 2 is a side view of the minivan of FIG. 1 with the power sliding door open and an access ramp deployed.

FIGS. 1 and 2 illustrate a vehicle 10 (e.g. a minivan) suitable for use with the access control system of the present invention. The vehicle 10 includes a passenger side sliding door 14, a driver side sliding door 18 (FIG. 2), and at least one door control module, such as a power sliding door module (PSDM) 20, illustrated schematically in FIGS. 1 and 2. The PSDM 20 is operable to open and close the door 14. A second PSDM may be provided to open and close the door 18. In the illustrated vehicle 10, the PSDM 20 is provided by the factory as an OEM vehicle component, however the present invention can also be employed where an aftermarket manufacturer installs a non-OEM door control mechanism for opening and closing the door 14.

The vehicle 10 also includes a ramp 22 that is generally not provided by the vehicle manufacturer but is installed by an aftermarket manufacturer to improve access to the interior of the vehicle for, among other reasons, use by handicapped individuals. The ramp 22 is moveable between a deployed position (shown in FIG. 2) in which the ramp affords access to the vehicle interior, and a stowed position in which the ramp 22 is positioned entirely within the vehicle. The ramp 22 includes a ramp control system 24 which can include, among other things, a ramp motor and a ramp drive system that are operable to move the ramp 22 between the stowed and deployed positions. The ramp 22 may also include ramp sensors that are operable to sense or detect whether the ramp is deployed or stowed, or whether the ramp encounters an obstruction while moving between the deployed and stowed positions. The vehicle 10 may also include a kneeling system (not shown) that is operable to lower the vehicle to reduce the angle of the ramp 22 when the ramp 22 is deployed.

Figure 3:
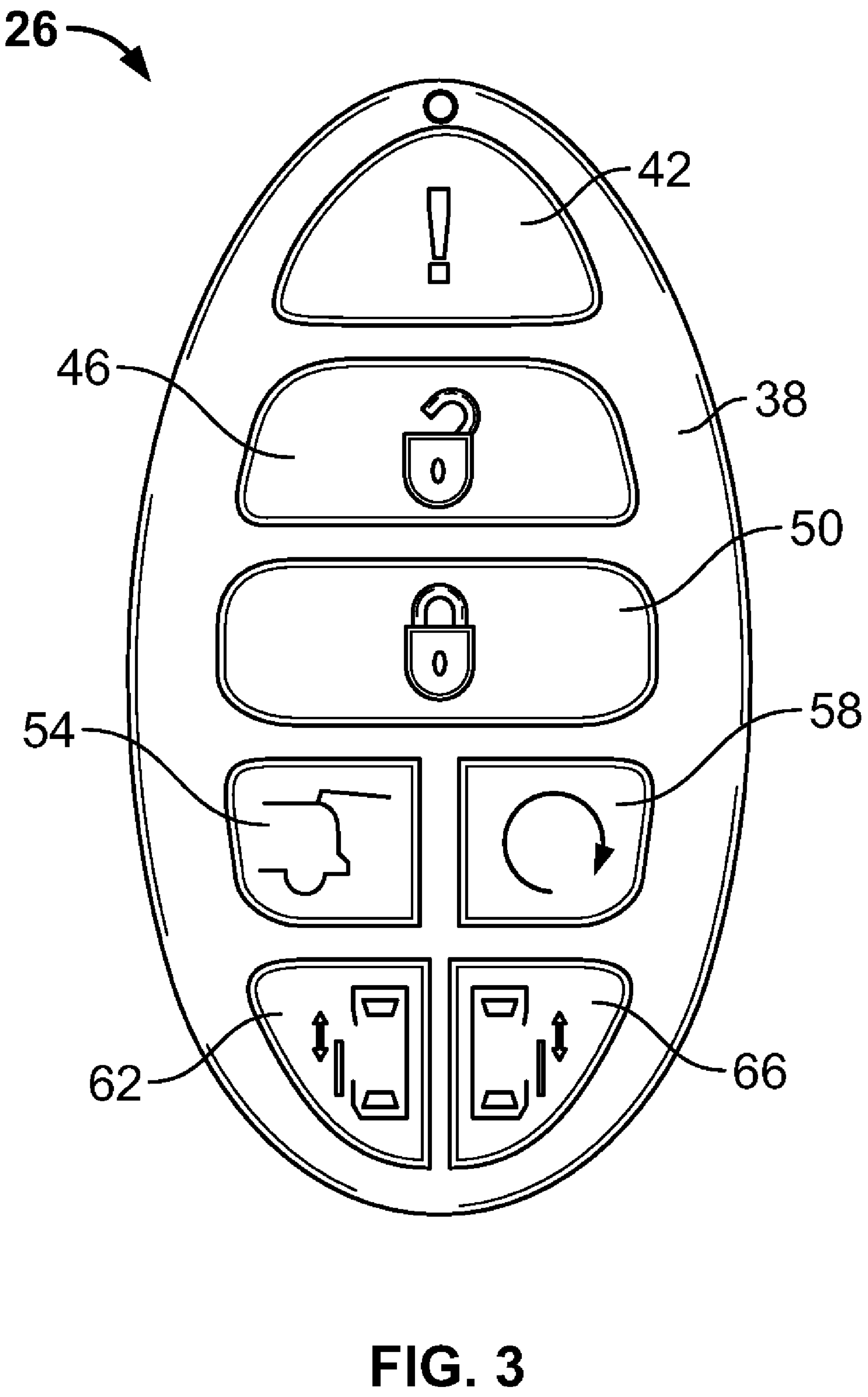
FIG. 3 is a top view of a key fob for the minivan of FIG. 1.
Figure 4:
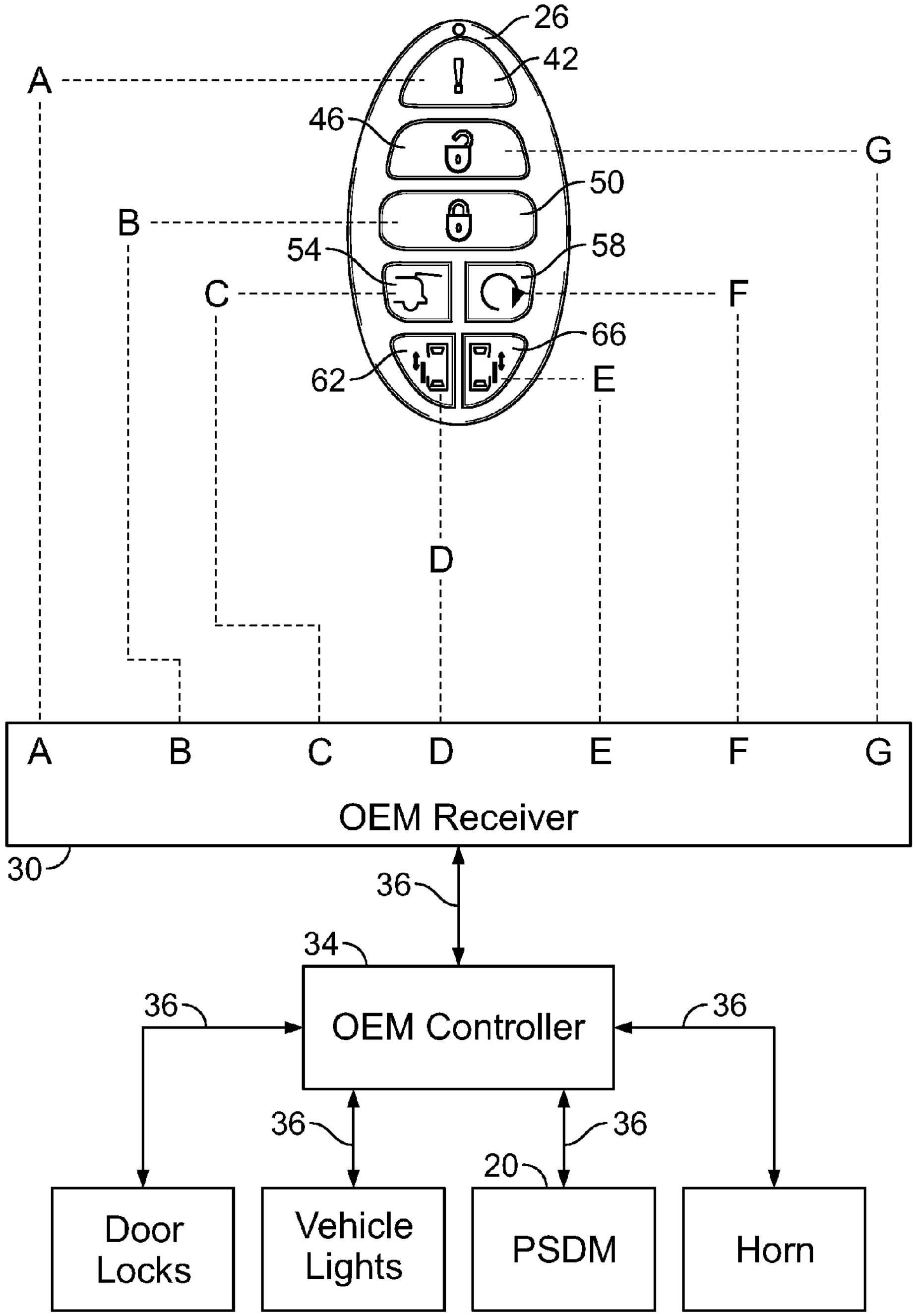
FIG. 4 is a schematic view of an OEM wireless control system including the key fob of FIG. 3.

With reference also to FIGS. 3 and 4, the vehicle 10 further includes an OEM remote keyless entry system including a remote control in the form of a key fob 26, and a receiver 30. The key fob 26 is configured to wirelessly communicate with the receiver 30, which in turn communicates with at least one controller 34. Alternatively, the receiver 30 and the controller 34 may be a single unit. The controller 34, which may be in the form of a body control module ("BCM") or other OEM control module, communicates with other vehicle systems, which may include other vehicle control modules, for controlling one or more vehicle components such as the door locks, the vehicle lights, the PSDM 20, and the horn, among others. While systems vary depending upon the vehicle manufacturer, the receiver 30 and the controller 34 generally communicate by way of the vehicle wiring, which may include one or more communication pathways 36, such as a data BUS. Other vehicles may include components, including the receiver 30 and the controller 34, that communicate wirelessly. Because OEM wiring and communication systems can vary, as used herein, unless otherwise specified, the "communication pathway" should be understood as including one or more wires, cables, or other transmission medium (including transmission medium for wireless signals), for carrying discrete signals and/or binary data between components. The one or more communication pathways 36 can be configured in a variety of ways for control of a variety of vehicle functions, including those controlled by the key fob 26, as discussed further below.

The illustrated key fob 26 includes a housing 38 and a variety of buttons including a panic button 42, an unlock button 46, a lock button 50, a liftgate button 54, a remote start button 58, a driver side sliding door button 62 and a passenger side sliding door button 66. Of course different key fobs may have more or fewer buttons for controlling the same or different vehicle functions. In general, pressing or pressing and releasing any of the key fob buttons sends a signal from the key fob 26 to the receiver 30. As illustrated, each button on the key fob 26 sends a different signal (A, B, C, D, E, F, or G) that is received and recognized by the receiver 30. The receiver 30 then communicates with the controller 34 via the communication pathway 36 to indicate which signal has been received, and the controller 34 sends instructions along the communication pathway 36 to operate the appropriate vehicle systems. In other embodiments, the system may be configured such that the receiver 30 sends signals directly to other vehicle systems via the communication pathway, making it unnecessary to first send a signal to the controller 34.

In the illustrated system, pressing the panic button 42 sends a signal A that is received by the receiver 30. The receiver 30, upon receiving and recognizing the signal A, communicates with the controller 34 via the communication pathway 36 to indicate that the signal A has been received. The controller 34 then sends signals along the communication pathway 36 instructing appropriate vehicle systems, such as the horn and lights, to operate. Other signals that the key fob 26 is configured to send, and which the receiver 30 is configured to receive, include a door lock signal B, a liftgate open signal C, a driver side door open/close signal D, a passenger side door open/close signal E, a start engine signal F, and a door lock signal G. Of course other or additional signals associated with other vehicle functions and systems can also be provided, depending upon the specific configuration of the vehicle. As illustrated in FIG. 4 (as well as FIGS. 5 and 7, discussed below), wireless signals are depicted in dashed lines, while signals that, in the illustrated embodiment, are generally sent over wires and/or cables of the communication pathway 36 are depicted in solid lines. However, because the communication pathway 36 may include wireless pathways, it should be appreciated that at least some of the signals depicted as being sent along wires and/or cables may also be sent wirelessly.

The PSDM 20 includes sensors or other indicators that communicate with the controller 34 to indicate whether the passenger side sliding door 14 is opened, closed, or in the process of opening or closing. The PSDM 20 may also include or communicate with sensors that detect whether the sliding door 14 encounters an obstruction while it is opening or closing. In some instances, if an obstruction is detected the PSDM 20 will operate to stop or reverse movement of the door 14.

Figure 5:
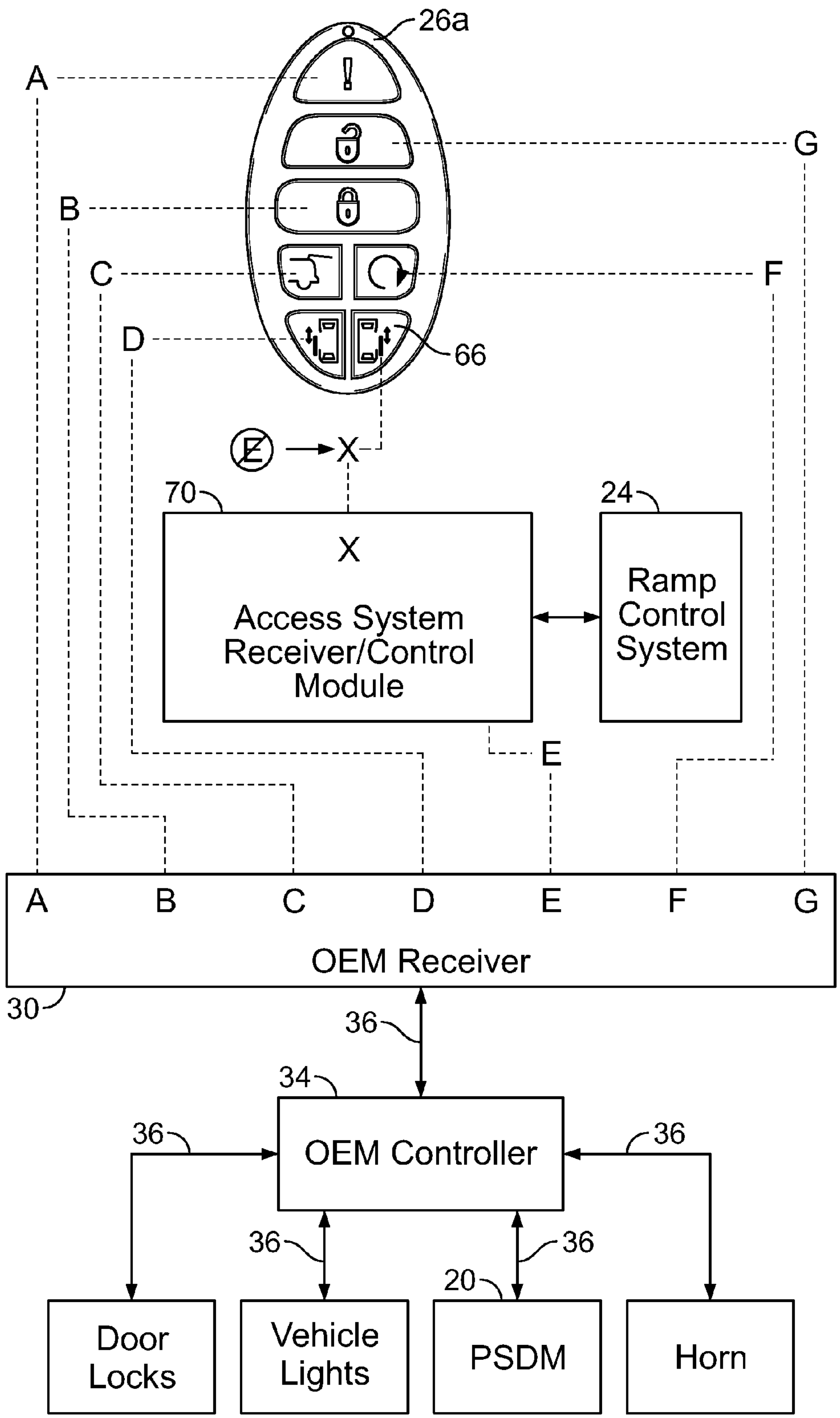
FIG. 5 is a schematic view of a first modified wireless control system.

FIG. 5 illustrates an OEM remote keyless entry system that is modified such that operation of the non-OEM ramp 22 can be coordinated with operation of the OEM PSDM 20. In FIG. 5, the OEM key fob has been modified or has been replaced by an aftermarket key fob, and is therefore designated with the reference numeral 26*a*. The modified keyless entry system also includes an access system control module 70 that is installed in the vehicle 10. The module 70 includes, among other things, a receiver and a wireless transmission device. The module may also include or communicate with a door position sensor 74 (see FIG. 2). The module 70 is also in communication with the ramp control system 24. The module 70 and the ramp control system 24 may be in direct, wired communication with one another or may communicate wirelessly. The module 70 and the ramp control system 24 may be in the same or different housings, and may share or combine certain functions relating to operation of the ramp 22. For example, sensors for detecting ramp obstructions may be part of the ramp drive system. These sensors may in turn be in communication with the module 70, and the module 70 may include programming logic that interprets the signals received from the sensors to determine whether a ramp obstruction has been encountered.

In the illustrated construction, the module 70 is not connected to the vehicle communication pathway 36. In this regard, installation of the module 70 does not require splicing into or otherwise connecting with the OEM wiring of the vehicle 10. In some constructions, the only connection with OEM wiring that may be necessary is connection to a source of electrical power and a ground. In other constructions, the module 70 can be powered by batteries and be substantially completely isolated from the vehicle wiring.

The door position sensor 74 is operable to detect the position of the passenger side sliding door 14. The door position sensor 74 can take on numerous forms, including a plurality of door position sensors, but, in the illustrated construction, includes an optical sensor operable to detect how far the door 14 is from the sensor 74. As illustrated, the sensor 74 may be mounted on or adjacent to the vehicle B pillar. The sensor 74 communicates with the module 70 such that the module 70 knows whether the door 14 is opened, closed, or in the process of opening or closing. In other constructions, the module 70 may be connected with the vehicle communication pathway 36 such that that the module 70 can detect signals sent along the communication pathway 36 by the PSDM 20 indicating whether the door is opened, closed, or in the process of opening or closing.

The modified key fob 26*a* is configured such that, upon pressing the passenger side sliding door button 66, the key fob 26*a* sends a non-OEM signal X, instead of the OEM signal E. The signal X can be substantially any signal that is not used by the OEM receiver 30 for operation of an existing vehicle function. The module 70 is configured to receive the signal X and, depending on whether the passenger side sliding door 14 is open or closed, perform either an opening or closing sequence of operations. If the modified key fob 26*a* is an aftermarket key fob and not a modified OEM unit, the remaining buttons on the aftermarket key (e.g. panic, lock, unlock, lift gate, remote start, and driver side sliding door) would be configured to send the same signals as the OEM key fob.

Figure 6:
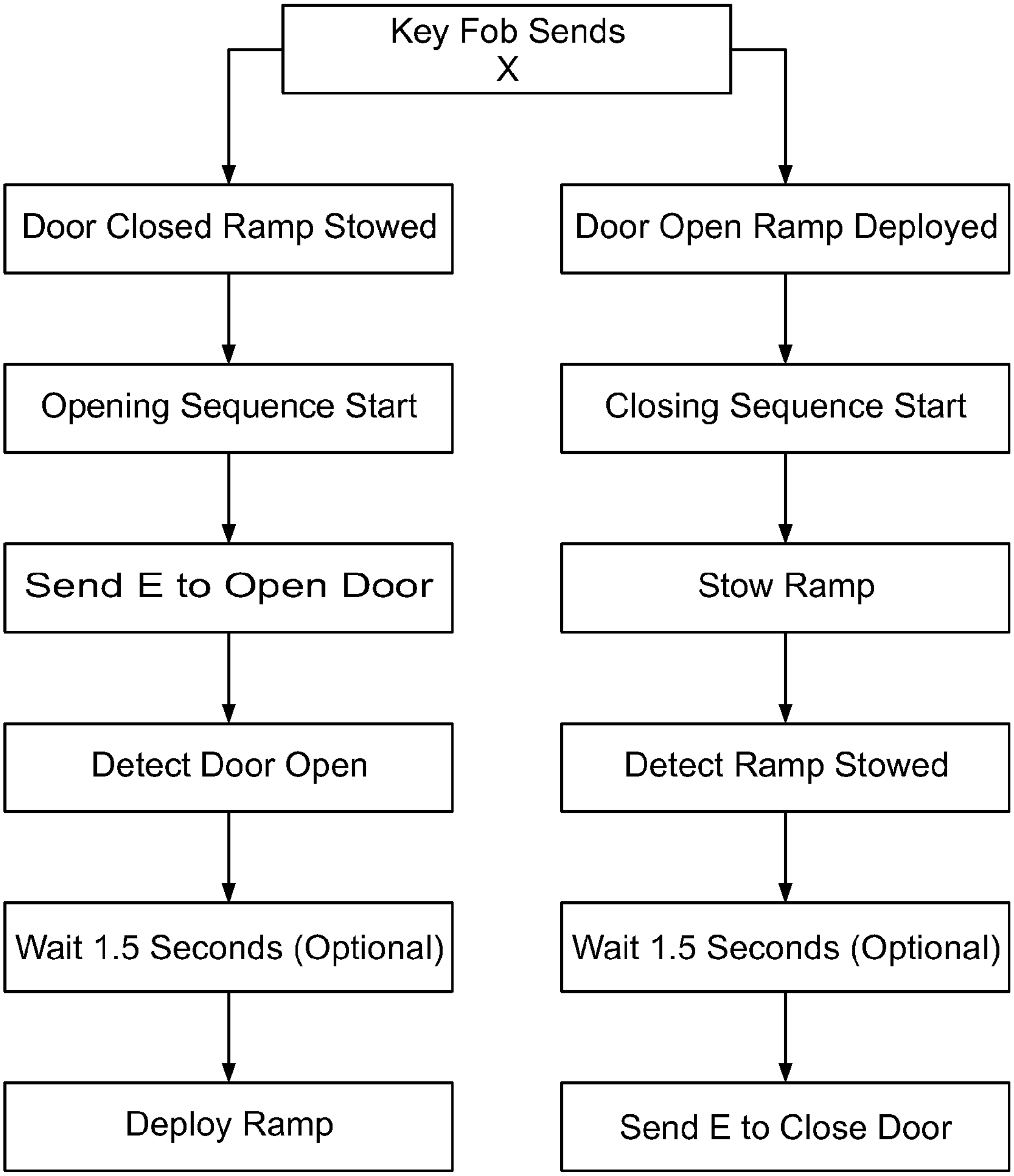
FIG. 6 is a flow chart illustrating operation of the modified wireless control system of FIG. 5.

With reference also to FIG. 6, upon receiving the signal X, the module 70 determines whether the door 14 is opened or closed (e.g. by communicating with the sensor 74) and whether the ramp 22 is stowed or deployed (in some embodiments, the module 70 may already know the status of the door and the ramp before receiving the signal X). If the door 14 is closed and the ramp 22 is stowed, the module 70 will begin the opening sequence by wirelessly transmitting the OEM passenger side sliding door signal E. The signal E will then be received by the receiver 30, which will respond by operating in accordance with the OEM procedure to open the door (i.e., as if the signal E had been sent by an unmodified key fob). For example, for the OEM configuration illustrated in the figures, the receiver communicates with the controller 34 (if necessary), and the PSDM 20 so that the PSDM 20 will be instructed to open the door 14 in response to receiving the signal E from the module 70. When the module 70 receives a signal that the door 14 is fully open (e.g. from the sensor 74), the module 70, perhaps after an optional waiting period of about 1.5 seconds, will instruct the ramp control system 24 to deploy the ramp 22. In another construction, the module 70 may simply wait a predetermined period of time after sending the signal E before deploying the ramp. This period of time would correspond to the expected amount of time required for the PSDM 20 to open the door 14, plus a specified waiting period. In this regard, the need for the door position sensor 74 may be reduced or eliminated.

If, upon receiving the signal X the module 70 determines that the door 14 is open and the ramp 22 is deployed, the module 70 will begin the closing sequence by first instructing the ramp control system 24 to stow the ramp 22. Once the ramp 22 has been stowed, and perhaps after an optional waiting period of about 1.5 seconds, the module 70 will transmit the OEM passenger side sliding door open/close signal E. The signal E will then be received by the receiver 30, which will respond by operating in accordance with the OEM procedure to close the door (i.e., as if the signal E had been sent by an unmodified key fob). By modifying the key fob 26*a* to send the signal X, the module 70 is able to delay transmission of the OEM door open/close signal E until such time as the ramp 22 has been stowed. In this regard, stowing/deployment of the ramp 22 is coordinated with closing/opening of the door 14 such that a single operation of the passenger side sliding door button 66 controls both functions.

Figure 7:
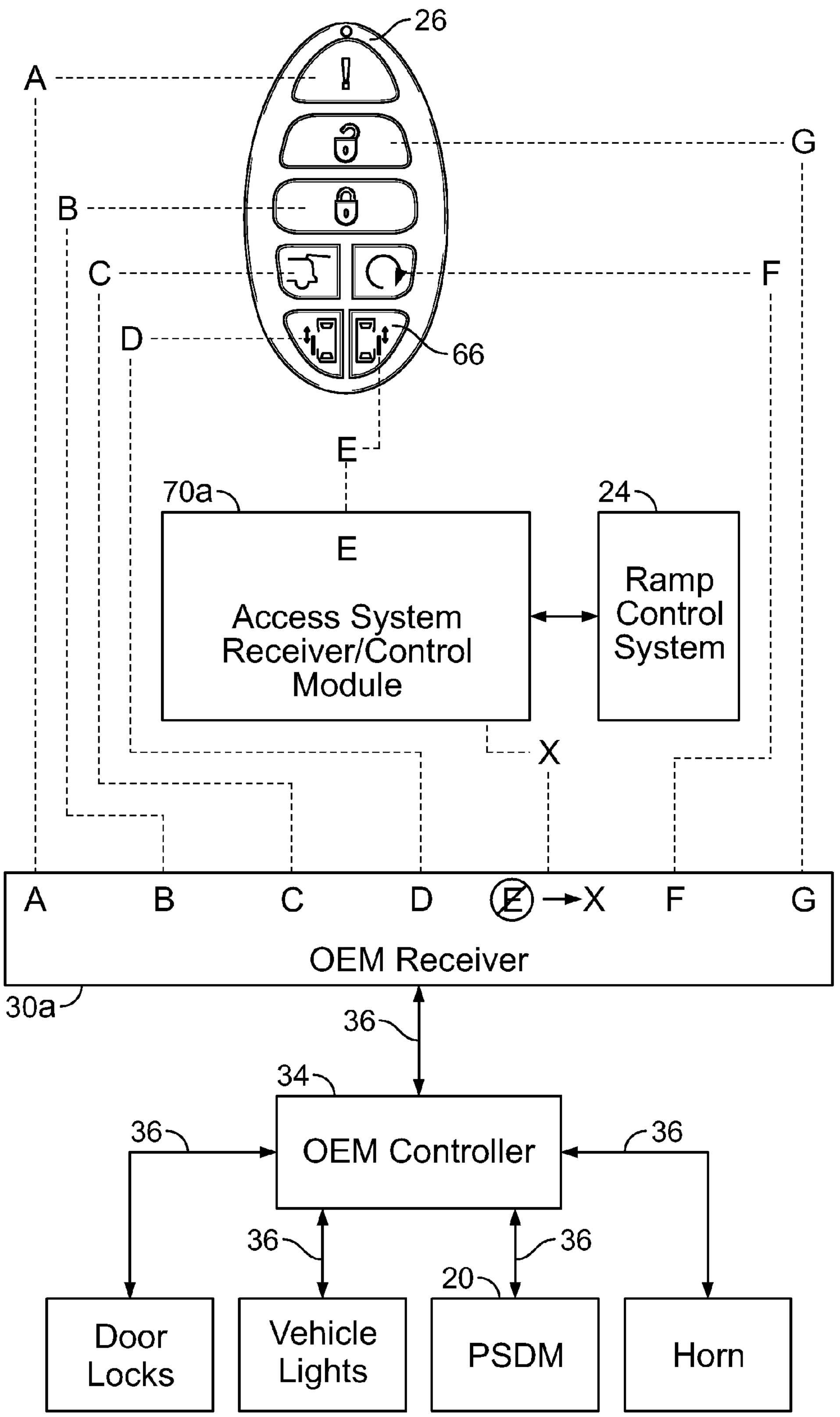
FIG. 7 is a schematic view of a second modified wireless control system.

FIG. 7 illustrates another type of modified OEM remote keyless entry system. In FIG. 7, instead of modifying the key fob 26 to send the non-OEM signal X, the OEM receiver 30 has been modified to receive and recognize the non-OEM signal X. The reference numeral 30*a* is used to designate the modified receiver, while the reference numeral 26 is used to designate the key fob, as the key fob of FIG. 7 is or can be the same key fob 26 utilized with the OEM system of FIG. 4. The receiver 30*a* is modified such that receipt of the signal X initiates the same operations as receipt of the OEM signal E in an unmodified receiver. That is, receipt of the signal X results in the sending of signals along the communication pathway 36 which cause operation of the PSDM 20 to open or close the door 14.

With regard to the access system control module 70*a*, instead of receiving the non-OEM signal X and transmitting the OEM signal E, the module 70*a* is configured to receive the OEM signal E and transmit the non-OEM signal X. The primary difference between the system of FIG. 5 and the system of FIG. 7 lies in which OEM component, the key fob 26 or the receiver 30, is modified. Selecting one system over the other will often be based upon which OEM component is easier to modify. For example, if an aftermarket key fob is used, the construction of FIG. 5 would likely be selected because it does not require modification of the OEM receiver 30. Similarly, if the key fob provided by the OEM is particularly easy to modify, the construction of FIG. 5 would again likely be selected. On the other hand, if the OEM receiver is easily modified while the OEM key fob is not, then the construction of FIG. 7 would likely be selected.

Figure 8:
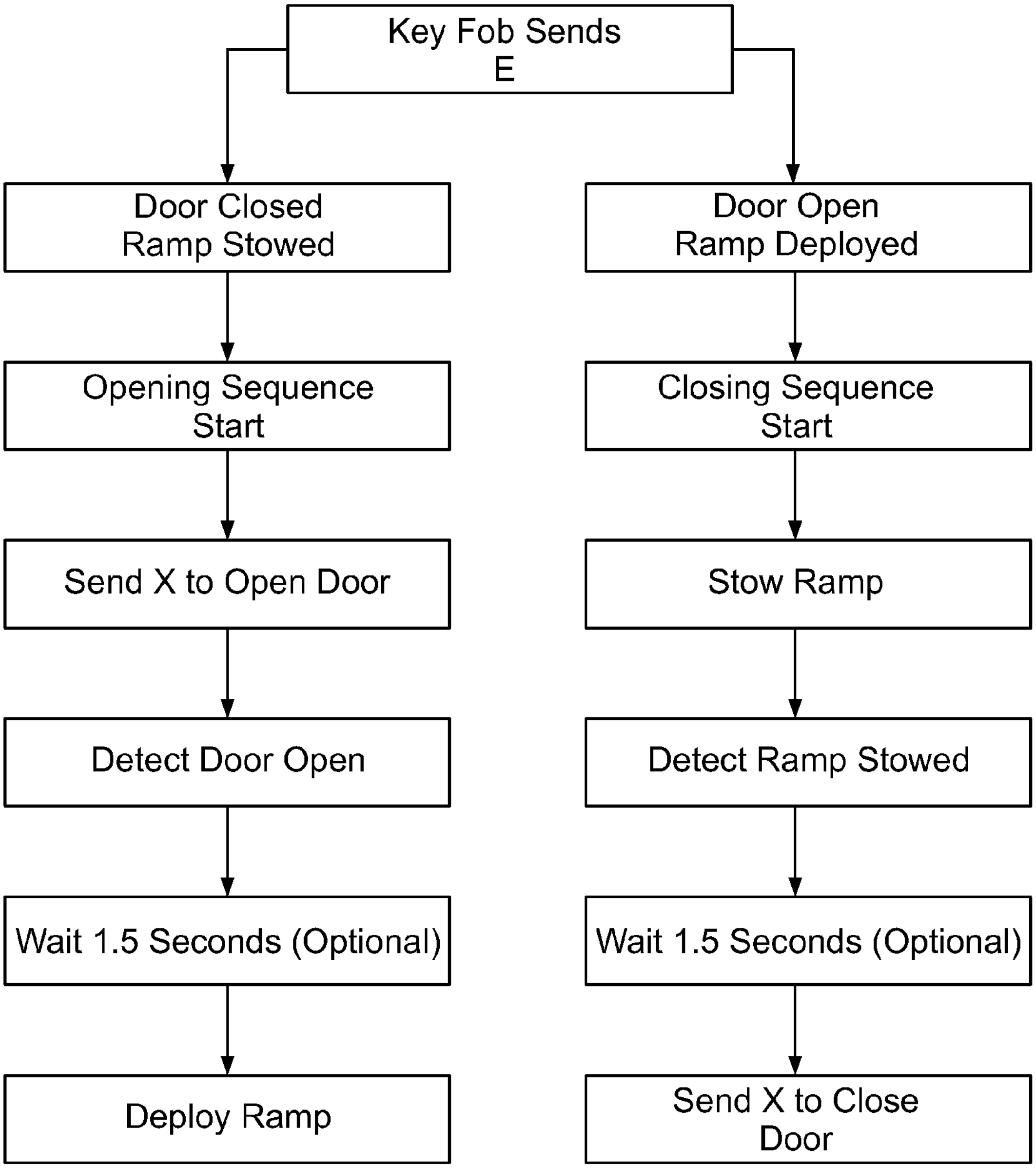
FIG. 8 is a flow chart illustrating operation of the modified wireless control systems of FIG. 7.

With reference also to FIG. 8, pressing the passenger side sliding door button 66 transmits the OEM passenger side sliding door signal E, which is received by the module 70*a* but not detected or recognized by the modified receiver 30*a*. Upon receiving the signal E, the module 70*a* determines whether the door is opened or closed (e.g. by communicating with the sensor 74) and whether the ramp 22 is stowed or deployed (in some embodiments, the module 70*a* may already know the status of the door and the ramp before receiving the signal E). If the door 14 is closed and the ramp 22 is stowed, the module 70*a* will begin the opening sequence by wirelessly transmitting the signal X. The signal X will then be received and recognized by the modified receiver 30*a*, which will respond by operating in accordance with the OEM procedure to open the door (i.e., as if the OEM signal E had been received by an unmodified receiver). For example, for the OEM configuration illustrated in the figures, the receiver communicates with the controller 34 (if necessary), and the PSDM 20 so that the PSDM 20 will be instructed to open the door 14 in response to the modified receiver 30*a* receiving the signal X from the module 70*a*. When the module 70*a* receives a signal that the door 14 is fully open (e.g. from the sensor), the module 70*a*, perhaps after an optional waiting period of about 1.5 seconds, will instruct the ramp control system 24 to deploy the ramp 22. The alternative construction discussed above in which the module 70*a* waits a predetermined period of time (e.g. the period of time it takes for the PSDM 20 to open the door 14, plus an appropriate wait period) before deploying the ramp 22 may also be employed.

If, upon receiving the signal E from the key fob 26 the module 70*a* determines that the door 14 is open and the ramp 22 is deployed, the module 70*a* will begin the closing sequence by first instructing the ramp control system 24 to stow the ramp 22. Once the ramp 22 has been stowed, and perhaps after an optional waiting period of about 1.5 seconds, the module 70*a* will transmit the signal X. The signal X will then be received by the receiver 30*a*, which will respond by operating in accordance with the OEM procedure to close the door (i.e., as if the signal E had been received by an unmodified receiver). By modifying the receiver 30*a* to receive the signal X instead of the signal E, the module 70*a* is able to delay transmission of the door open/close signal, which in this system is the signal X, until such time as the ramp 22 has been stowed. In this regard, stowing/deployment of the ramp 22 is coordinated with closing/opening of the door 14 such that a single operation of the passenger side sliding door button 66 controls both functions.

A vehicle kneeling system can be incorporated with both of the systems illustrated in FIGS. 5 and 7. In each case, the module 70 or 70*a* can be configured to communicate with the kneeling system such that the vehicle kneels or stands generally while the door is opening or closing and/or the ramp is being deployed or stowed.

In addition to coordinating opening/closing of the door 14 and deploying/stowing of the ramp 22 using the key fob 26 or 26*a*, the systems may also provide for coordination of these systems using switches provided on the interior of the vehicle 10. For example, with reference to FIGS. 9 and 10, many manufacturers provide interior switches 80, 82 for controlling opening and closing of the passenger and driver side sliding doors 14, 18, respectively. The switches 80, 82 are often positioned near the front driver and/or passenger seats, while other switches for controlling the doors 14, 18 may also be provided on the vehicle B pillar or on the doors 14, 18 themselves. These switches, including switches 80, 82, are generally hard-wired into one or more of the vehicle communication pathways 36.

To coordinate movement of the passenger side sliding door 14 and the ramp 22 using the interior switch 80, the switch 80 is reconfigured to operate by way of the same wireless communication signals as used for the key fob 26 or 26*a*. For example, if the vehicle 10 is configured using the system of FIG. 5 including the modified key fob 26*a*, the switch 80, and any other interior switch for operating the passenger side sliding door 14, is disconnected from the vehicle wiring and is instead wired to a circuit board 83*a* taken from an additional, but similarly modified key fob 26*a* (e.g. a key fob 26*a* modified to transmit the non-OEM signal X). In many instances these additional key fobs and/or circuit boards 83*a* can be acquired from the vehicle manufacturer and subsequently modified as necessary. For example, the circuit board 83*a* may be removed from the key fob housing or may be provided as a single component. Circuit boards 83*a* from aftermarket key fob suppliers can also be used and configured to transmit the non-OEM signal X. Leads from the switch 80 can be wired to the circuit board 83*a* using soldering or other known methods. Once the circuit board 83*a* is wired to the switch 80, operation of the interior switch sends the wireless signal X from the circuit board 83*a*. The signal X is detected by the module 70 and operation of the PSDM 20 and ramp control system 24 proceeds as discussed above with respect to FIGS. 5 and 6.

The circuit boards 83*a*, being relatively small, can be mounted in such a way that they are hidden behind the interior trim of the vehicle 10, generally directly behind the interior switch or switches to which they are connected. Only the key fob circuitry relating to operation of the passenger side sliding door (e.g. the circuitry associated with the passenger side sliding door button 66) needs to be wired to the interior passenger side sliding door control switch 80 to provide for coordinated opening/closing of the door 14 and deploying/stowing of the ramp 22. However if other interior switches, such as the driver side sliding door switch 82, are positioned nearby, those switches could also be wired into the key fob circuit board 83*a* if desired. These switches would then operate using the standard vehicle control signals, such as the signal D for the driver side sliding door 18.

If the system of FIG. 7 is employed including the modified receiver 30*a*, then unmodified circuit boards 83 from standard key fobs 26 that send the same control signals as the primary key fob 26 (including, e.g., the OEM signal E) can be used. These circuit boards 83 are wired to the interior switch 80 and other switches for controlling the passenger side sliding door 14 in the same way as the circuit boards 83*a* discussed above, and may similarly be wired to other interior switches. In this system, operation of one of the interior control switches 80 for the passenger side sliding door 14 would send the OEM signal E from the key fob circuit board 83. The signal E would be received by the module 70*a*, which would then send the non-OEM signal X to control operation of the PSDM 20 and ramp control system 24 in the same manner as discussed above with respect to FIGS. 7 and 8.

In other constructions, the interior switches 80 may be wired directly to the control module 70 or 70*a*, which would then operate to send or delay sending of the appropriate wireless control signal X or E, depending upon whether the system of FIG. 5 or FIG. 7 is being utilized. In yet other constructions, the control module 70 or 70*a* may be connected to one or more of the vehicle communication pathways 36 such that the module 70 or 70*a* is able to intercept the signal sent over the communication pathways 36 from the interior switch 80, and either transmit or delay transmission of the signal through the communication pathways 36 to coordinate operation of the PSDM 20 with the ramp control system 24. Alternatively, the module 70 or 70*a* can intercept the signal sent from the interior switch 80 over the communication pathways 36 and subsequently send or delay sending the wireless control signal X or E.

Figure 9:
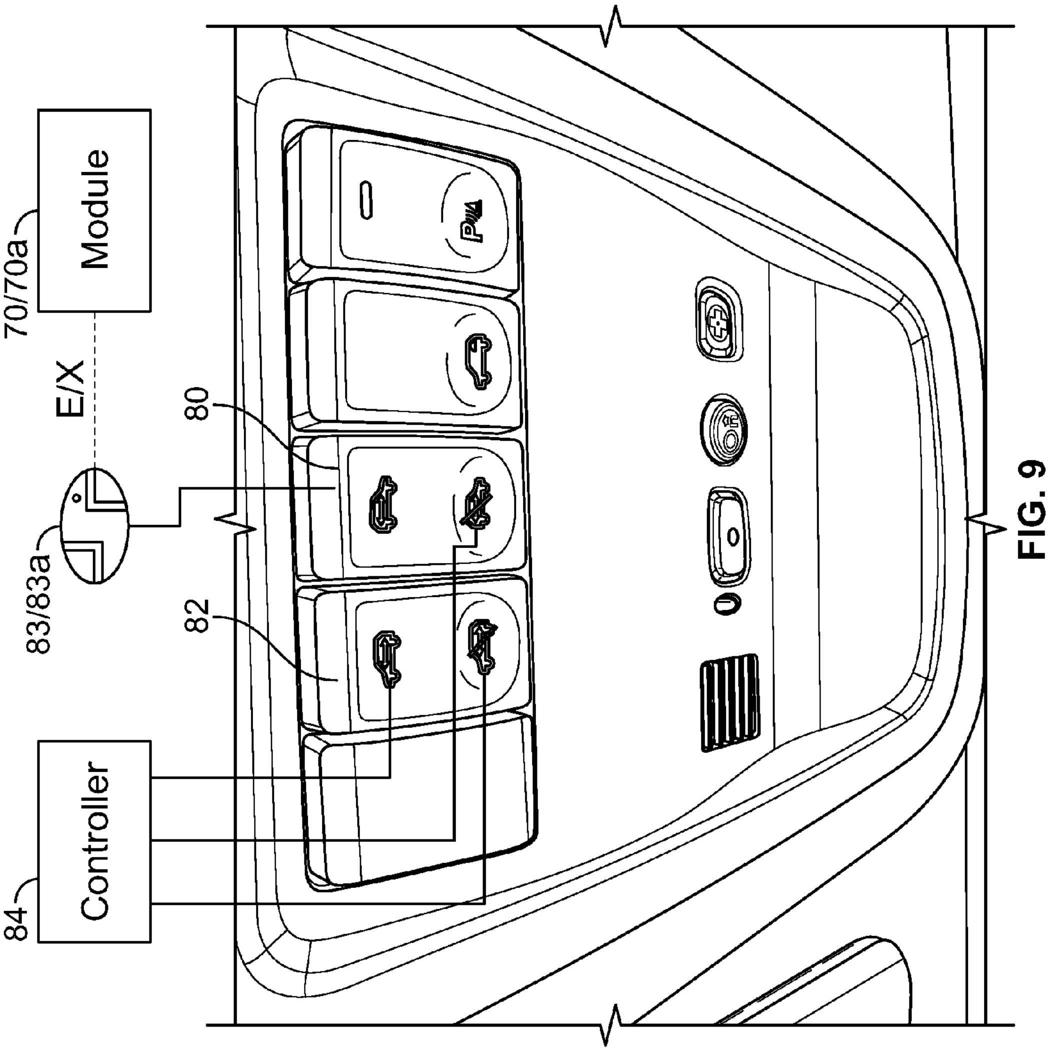
FIG. 9 is a perspective view of an interior vehicle control panel including switches for controlling powered sliding doors.
Figure 10:
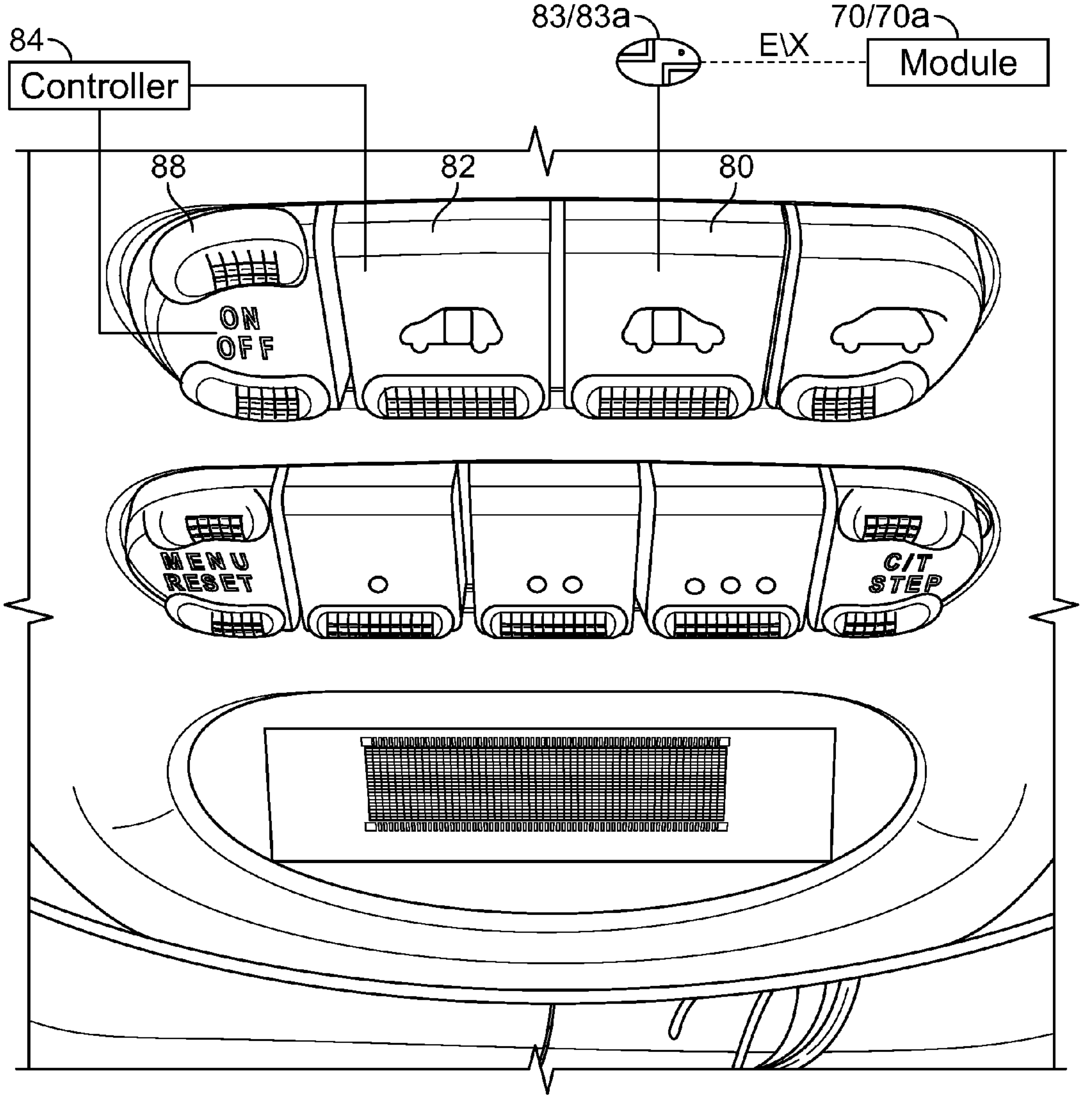
FIG. 10 is a perspective view of another interior vehicle control panel including switches for controlling powered sliding doors.
Figure 11:
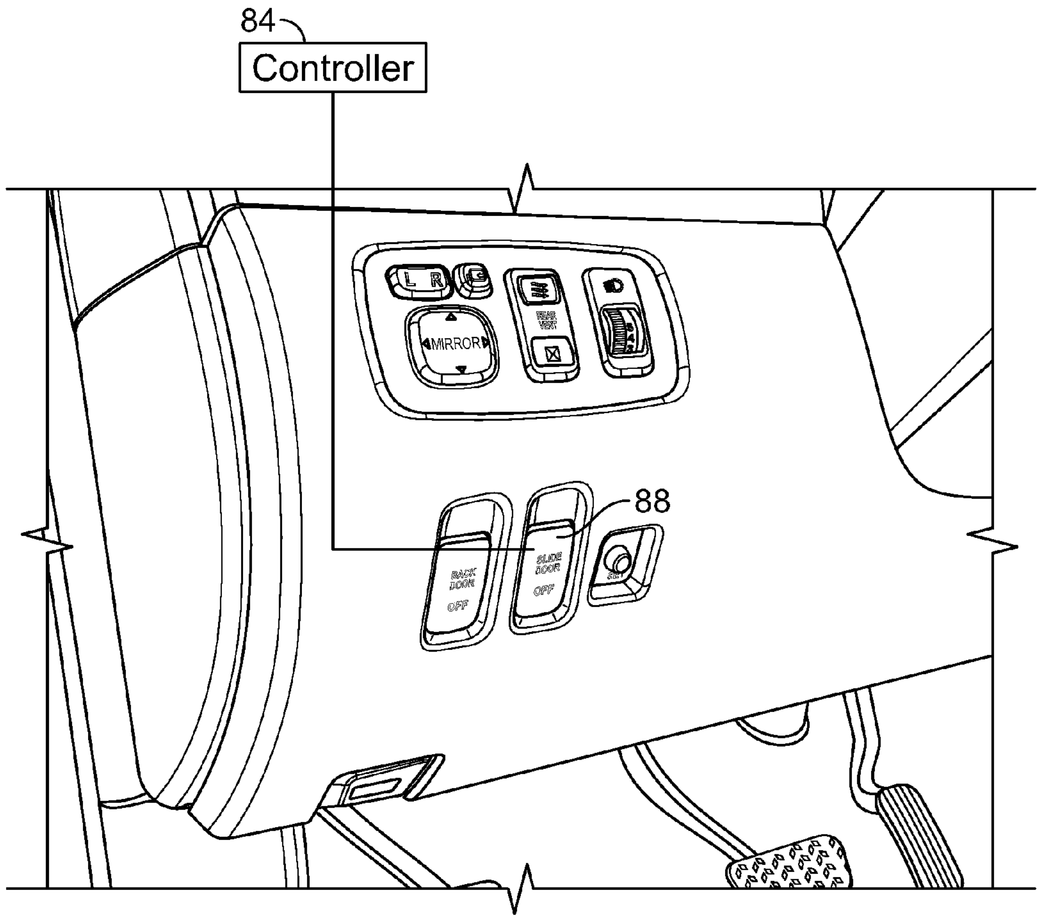
FIG. 11 is a perspective view of yet another interior vehicle control panel including switches for controlling powered sliding doors.

With reference also to FIG. 11, coordination of operation between the ramp control system 24 and the PSDM 20 can also be achieved by connecting a controller 84 (which may or may not include or be a component of the module 70) with OEM-provided disable switches 88. A system utilizing the controller 84 and the disable switches 88 can be used in combination with the systems of FIGS. 9 and 10 discussed above, or may be part of a different system in which the interior switches 80, 82 remain connected to the communication pathways 36. The disable switches 88 are provided by the OEM to disable operation of the power sliding doors 14, 18, for example to prevent opening and closing of the door in response to operation of buttons by children in the rear passenger area of the vehicle. The disable switches 88 are generally provided near the driver's area of the vehicle (e.g. near the interior switches 80, 82, as illustrated in FIGS. 9 and 10) and communicate with the OEM controller 34 to disable powered operation of the doors 14, 18. In FIG. 9, there is a disable switch 88 for each interior switch 80, 82, which allows for individually disabling the passenger and driver side sliding doors 14, 18. In FIGS. 10 and 11, a single switch 88 disables powered operation of both doors 14, 18.

The controller 84 is connected to the disable switch 88 such that the controller 84 is able to replicate the signal that would be provided if the switch 88 were engaged to disable operation of the doors 14, 18. Depending on the configuration of the OEM vehicle wiring, such as whether the disable switch 88 is normally open or normally closed, the controller 84 may be wired in parallel or in series between the disable switch 88 and the OEM controller 34 to maintain normal operation of the disable switch 88. The controller 84 is also in communication with the ramp control system 24 to receive signals relating to whether the ramp 22 is stowed, deployed, or in the process of being stowed or deployed. The controller 84 is configured such that whenever the ramp 22 is not stowed, the controller 84 replicates the signal that would be provided to the OEM controller 34 if the switch 88 were engaged, thereby disabling operation of the doors 14, 18. Thus, if the ramp 22 is not stowed, all powered movement of the door 14 is prevented.

For example, if the door 14 is open and the ramp 22 is deployed, the controller 84 sends a signal along the communication pathway 36 that is the same as the signal that would be sent if the disable switch 88 was engaged. The OEM controller 34 recognizes this signal and operates to prevent operation of the PSDM 20. If a signal E is sent from an unmodified key fob 26, the replicated disable switch signal overrides receipt of the signal E by the OEM receiver 30 such that the door 14 does not close while the ramp 22 deployed. The module 70*a* can be configured to instruct the ramp control system 24 to stow the ramp 22 in response to receipt of the signal E. Once the ramp 22 is fully stowed, the module 70*a* (and/or the controller 84) operates to remove the replicated disable switch signal from the communication pathway 36, such that the OEM controller 34 will allow powered operation of the door 14. The module 70*a* (and/or the controller 84) then re-sends a close door signal by way of either the wireless signal E or the communication pathway 36 so that the PSDM 20 operates to close the door 14.

What is claimed is:

1. A method of modifying an OEM keyless entry system of a vehicle to coordinate operation of at least one OEM component with operation of at least one non-OEM component, the method comprising:

selecting a vehicle having an OEM keyless entry system including a remote control and a receiver, the remote control wirelessly communicating with the receiver through a plurality of OEM signals to remotely operate OEM components;

modifying the receiver to receive a non-OEM signal instead of a selected one of the OEM signals;

installing a non-OEM component in the vehicle;

coupling a non-OEM control module to the non-OEM component;

configuring the non-OEM control module to receive the selected one of the OEM signals, and to transmit the non-OEM signal;

configuring the non-OEM control module to determine a condition of both the OEM component and the non-OEM component in response to receiving the selected one of the OEM signals; and configuring the non-OEM control module to transmit the non-OEM signal after determining the condition of both the OEM component and the non-OEM component.

2. The method of claim 1, wherein selecting a vehicle includes selecting a vehicle wherein the at least one OEM component includes a power sliding door, and wherein the selected one of the OEM signals includes a power sliding door open/close signal.

3. The method of claim 1, wherein installing the non-OEM component in the vehicle includes installing a vehicle access ramp that is moveable between a stowed position and a deployed position.

4. The method of claim 1, wherein the selected one of the OEM signals is associated with the at least one OEM component for requesting operation of the at least one OEM component, the method further comprising coupling the non-OEM control module to a communication pathway of the vehicle for sending a wired communication signal over the communication pathway to request operation of the at least one OEM component.

5. The method of claim 1, further comprising coupling a vehicle interior switch to a portion of an additional remote control that is configured to transmit one of the non-OEM signal and the selected one of the OEM signals, wherein the vehicle interior switch is thereby operable to send a wireless signal to remotely operate the at least one OEM component.

6. The method of claim 5, wherein coupling the vehicle interior switch to a portion of an additional remote control includes disconnecting the vehicle interior switch from at least some vehicle wiring, and connecting the vehicle interior switch to a circuit board portion of the additional remote control.

7. A method of modifying an OEM keyless entry system of a vehicle to coordinate operation of at least one OEM component with operation of at least one non-OEM component, the method comprising:

selecting a vehicle having a keyless entry system including a remote control and a receiver, the remote control wirelessly communicating with the receiver through a plurality of OEM signals to remotely operate OEM components;

modifying the remote control to send a non-OEM signal instead of a selected one of the OEM signals;

installing a non-OEM component in the vehicle;

coupling a non-OEM control module to the non-OEM component;

configuring the non-OEM control module to receive the non-OEM signal from the remote control;

configuring the non-OEM control module to respond to receipt of the non-OEM signal from the remote control by determining a condition of both the OEM component and the non-OEM component; and configuring the non-OEM control module to transmit the selected one of the OEM signals after determining the condition of both the OEM component and the non-OEM component.

8. The method of claim 7, wherein the non-OEM control module includes a module wireless transmission device that transmits the selected one of the OEM signals.

9. The method of claim 7, wherein modifying the remote control includes replacing an OEM remote control with a non-OEM remote control, the method further comprising configuring the non-OEM remote control to send the non-OEM signal and each of the plurality of OEM signals other than the selected one of the OEM signals.

10. A method of modifying an OEM keyless entry system of a vehicle to coordinate operation of at least one OEM component with operation of at least one non-OEM component, the method comprising:

selecting a vehicle having a keyless entry system including a remote control and a receiver, the remote control wirelessly communicating with the receiver through a plurality of OEM signals to remotely operate OEM components;

modifying the receiver to be unresponsive to a selected one of the OEM signals;

installing a non-OEM component in the vehicle;

coupling a non-OEM control module to the non-OEM component; and, configuring the non-OEM control module to receive the selected one of the OEM signals from the remote control;

configuring the non-OEM control module to determine a condition of the OEM component and the non-OEM component in response to receiving the selected one of the OEM signals.

11. The method of claim 10, wherein modifying the receiver to be unresponsive to the selected one of the OEM signals includes modifying the receiver to receive a non-OEM signal instead of the selected one of the OEM signals, and wherein the non-OEM control module includes a module wireless transmission device that transmits the non-OEM signal to the modified receiver.

12. A vehicle access system comprising:

a vehicle having a powered sliding door movable between opened and closed positions;

a ramp coupled to the vehicle and movable between a stowed position and a deployed position;

an OEM keyless entry system including a remote control and a receiver, the remote control having been modified from its OEM configuration to send a non-OEM wireless signal, the receiver operable to cause movement of the door between the opened and closed; positions in response to receipt of an OEM wireless signal, and being non-responsive to the non-OEM wireless signal; and, a control module coupled to the ramp to control movement of the ramp between the stowed position and the deployed position, the control module including a module receiver and a module wireless transmission device, the module receiver configured to receive the non-OEM wireless signal from the remote control, wherein the control module determines the position of the door and the position of the ramp in response to the module receiver receiving the non-OEM wireless signal, and causes the module wireless transmission device to send the OEM wireless signal to the receiver to cause movement of the door after determining the position of the powered sliding door and the position of the ramp.

13. The vehicle access system of claim 12, wherein the vehicle includes an interior switch that is operable to control movement of the door, the vehicle access system further comprising an additional remote control coupled to the interior switch, the additional remote control configured to send the non-OEM wireless signal in response to operation of the interior switch.

14. A vehicle access system comprising:

a vehicle having a powered sliding door movable between opened and closed positions;

a ramp coupled to the vehicle and movable between a stowed position and a deployed position;

an OEM keyless entry system including a remote control and a receiver, the receiver having been modified from its OEM configuration to be non-responsive to an OEM wireless signal and responsive to a non-OEM wireless signal, the receiver operable to cause movement of the door between the opened and closed positions; and, a control module coupled to the ramp to control movement of the ramp between the stowed position and the deployed position, the control module including a module receiver and a module wireless transmission device, the module receiver configured to receive the OEM wireless signal from the remote control, wherein the control module determines the position of the door and the position of the ramp in response to the module receiver receiving the OEM wireless signal, and causes the module wireless transmission device to send the non-OEM wireless signal to the receiver to cause movement of the door after determining the position of the door and the position of the ramp.

15. The vehicle access system of claim 14, wherein the vehicle includes an interior switch that is operable to control movement of the door, the vehicle access system further comprising an additional remote control coupled to the interior switch, the additional remote control configured to send the OEM wireless signal in response to operation of the interior switch.

* * * * *